United States Patent [19]

Nishikawa et al.

[11] Patent Number: 4,982,642

[45] Date of Patent: Jan. 8, 1991

[54] METRONOME FOR ELECTRONIC INSTRUMENTS

[75] Inventors: Hiroshi Nishikawa, Nagoya; Akinari Inoue, Kasugai, both of Japan

[73] Assignee: Brother Kogyo Kabushiki Kaisha, Aichi, Japan

[21] Appl. No.: 523,356

[22] Filed: May 15, 1990

[30] Foreign Application Priority Data

May 26, 1989 [JP] Japan ................................. 1-134347

[51] Int. Cl.[5] ............................................. G09B 15/00

[52] U.S. Cl. ...................................................... 84/484

[58] Field of Search ................. 84/611, 612, 635, 636, 84/DIG. 12, 484, 633

[56] References Cited

U.S. PATENT DOCUMENTS 4,583,443 4/1986 Senghaas et al. ..................... 84/484

4,662,262 5/1987 Matsumoto .............. 84/DIG. 12 X 4,763,554 8/1988 Kozuki ..................... 84/DIG. 12 X

*Primary Examiner*—L. T. Hix

*Assistant Examiner*—Jae N. Noh

*Attorney, Agent, or Firm*—Oliff & Berridge

[57] ABSTRACT

The invention provides a metronome for electronic instruments, which has memory means, event data output means and control means. The control means instructs the event data output means to output code data for generating beat sound for a certain time period. The code data is outputted at pitches and volumes based on beat data and at time intervals according to tempo data both stored in the memory means. The metronomre of the invention outputs beat sound together with main sound for a tune, without any specific devices attached to electronic instruments.

20 Claims, 6 Drawing Sheets

METRONOME FOR ELECTRONIC INSTRUMENTS

BACKGROUND OF THE INVENTION

This invention relates to a metronome for electronic instruments utilizing, for example, an MIDI (musical instrument digital interface) for communication.

In addition to having a playing mechanism, electronic instruments generally have a metronome device for finding the correct speed for music in beats. The metronome device has a buzzer like system and generates any beats required. A player practices a tune on the musical instrument according to the beats generated and thus plays the tune at a correct tempo and with suitable beats.

While practicing a tune on the musical instrument, a player sometimes wears headphones and generates sound only through the headphones, thus preventing the noise from escaping to the surroundings. When the player with the headphones switches the metronome device on, however, beat sound is not generated through the headphones but from the buzzer like system of the metronome device. The noise is thereby not completely prevented nor does the player hear the beat sound sufficiently to play the tune in the correct beats.

There are metronome devices which generate beats not as sound but as a flicker of light. But when a player practices a tune by reading a score or looking at keys, he hardly gives attention to the flicker of light; this method is therefore not practical.

SUMMARY OF THE INVENTION

An objective of the invention is accordingly to provide a metronome for electronic instruments utilizing a communication method like an MIDI (musical instrument digital interface).

Another objective of the invention is to provide a metronome which generates beat sound through headphones, thus preventing noise pollution.

The above and other related objectives are realized by a metronome or a data output device for electronic instruments, as shown in FIG. 1, for outputting event data including code data used for operating electronic instruments. The metronome includes memory means M1 for storing tempo data representing the speed of the music and beat data representing the beats of the music, event data output means M2, and control means M3 that instruct the event data output means M2 to output code data, based on which an electronic instrument generates beat sound for a predetermined time period, at pitches and volumes corresponding to the beat data and at time intervals according to the tempo data.

The control means M3 instructs the event data output means M2 to output code data for generating beat sound for a certain time period. The code data is output based on data stored in the memory means M1; the code data is generated at pitches and volumes corresponding to beat data and at time intervals according to tempo data. An electronic instrument receives the code data and generates beat sound based thereon as well as generates main sound for a tune based on event data. The metronome of the invention outputs beat sound together with main sound for a tune without any specific devices attached to electronic instruments.

BRIEF DESCRIPTION OF DRAWINGS

The invention may be best understood by referring to the following detailed description of preferred embodiments and the accompanying drawings, wherein like numerals denote like elements and in which.

DETAILED DESCRIPTION OF PREFERRED EMBODIMENTS

Preferred embodiments of the invention are now described. Since there may be many modifications without departing from the scope of the invention, the embodiments below are not intended to limit the invention to the embodiments, but are intended to illustrate the invention more clearly.

Figure 2:
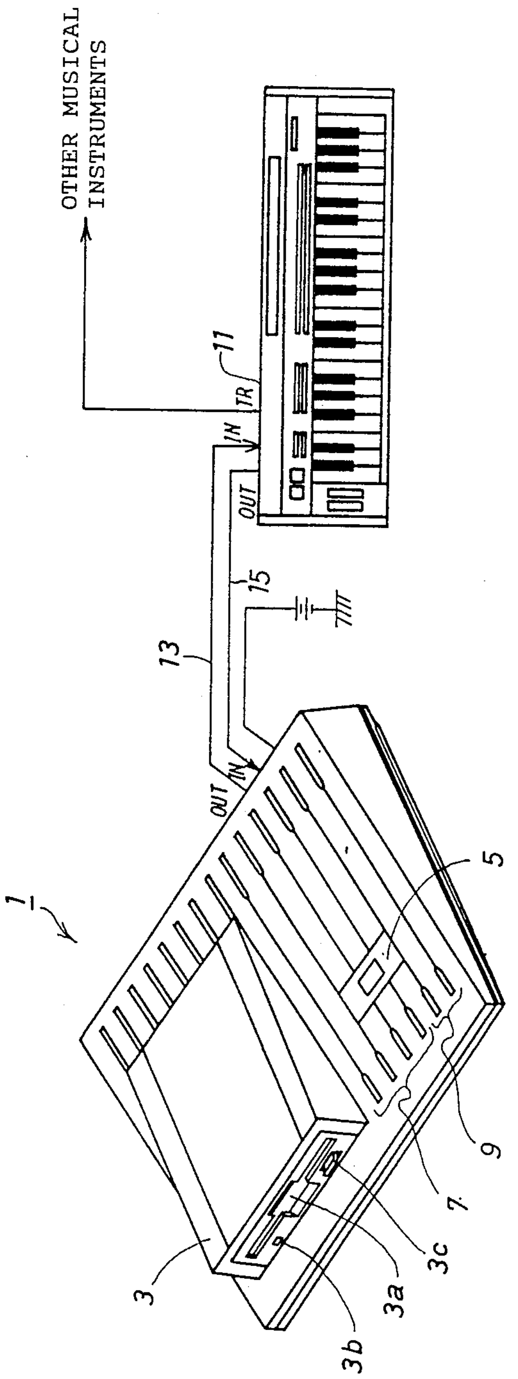
FIG. 2 is a schematic view illustrating an MIDI sequencer and a keyboard connected to each other as a first embodiment of the invention.

As shown in FIG. 2, an MIDI sequencer 1 includes a floppy disk unit 3, a liquid crystal display (hereinafter referred to as LCD) 5, function keys 7, and shift keys 9. The floppy disk unit 3 records and stores information for playing music including event data and time data onto a recording medium or a floppy disk and then reproduces the information stored thereon. The floppy disk unit 3 has a slot **3*a* in which a floppy disk is inserted, an access lamp 3*b* for indicating that the unit is in recording or reproducing, and an eject button 3*c*** for ejecting a floppy disk.

The MIDI sequencer 1 is connected to a keyboard 11 through MIDI signal cables 13 and 15. The sequencer 1 receives event data from the keyboard 11 and stores the event data together with time data showing the time of the reception as playing information; the sequencer 1 also outputs event data with such timing that time data stored with the event data controls the keyboard 11 or another musical instrument to make sound.

In recording or reproducing, the MIDI sequencer 1 outputs event data including code data for beat sound alone or together with event data for playing a tune to the keyboard 11 or any other musical instruments via the MIDI signal cable 13. The MIDI sequencer 1 accordingly has a metronome function.

The keyboard 11 receives event data sent from the MIDI sequencer 1 and distributes the event data to other musical instruments via a through terminal TR. Either of the MIDI signal cables 13 and 15 may be extended to be directly connected to other musical instruments. The MIDI sequencer thus receives event data from plural musical instruments and records them together with corresponding time data as playing information; the MIDI sequencer 1 also outputs event data based on time data to plural musical instruments to make them sound.

Figure 3:
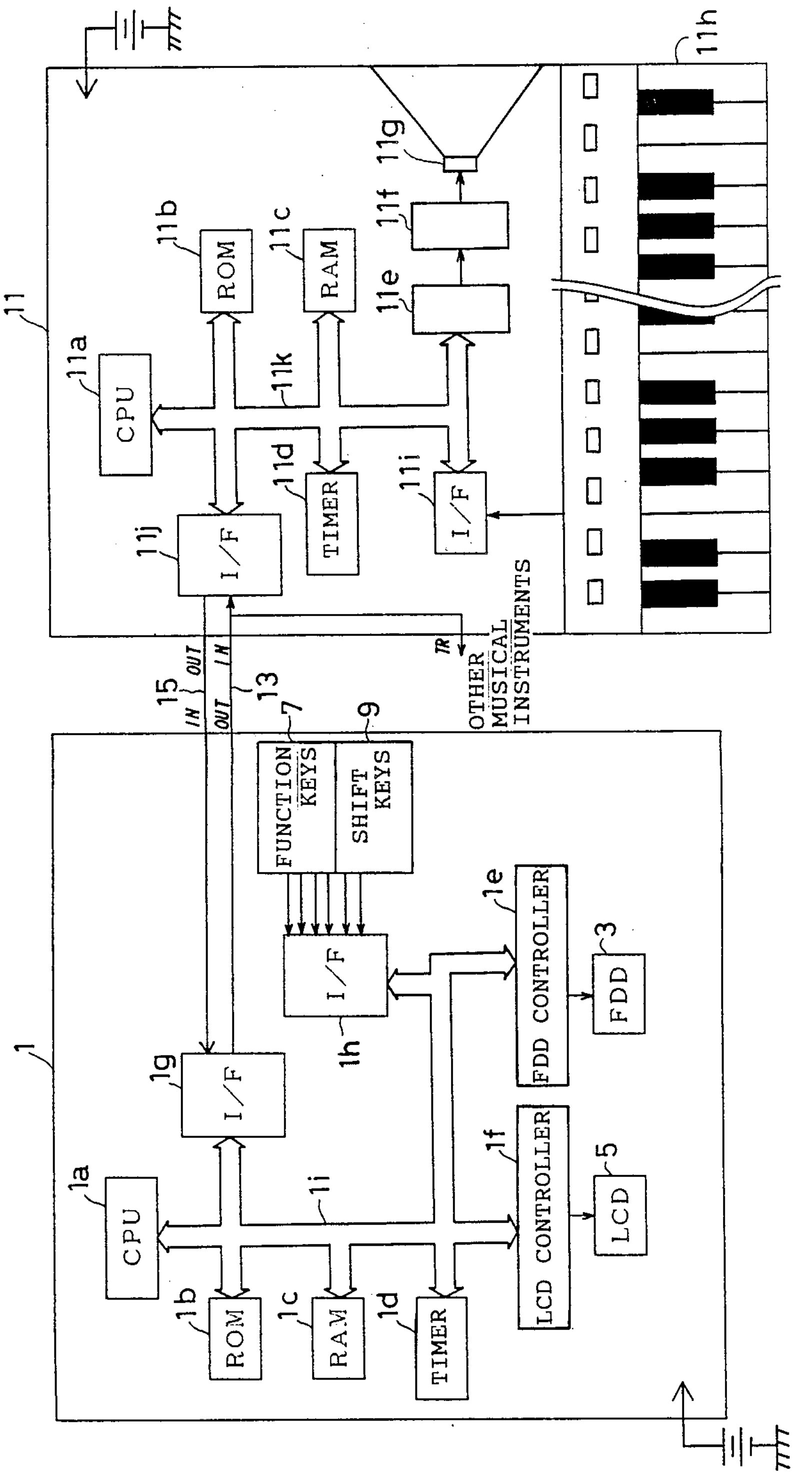
FIG. 3 is a block diagram showing the structure of the MIDI sequencer and the keyboard of FIG. 2.

FIG. 3 is a block diagram showing the signal processing system. The MIDI sequencer 1 has a central processing unit (hereinafter referred to as CPU) 1*a*, a read only memory (hereinafter referred to as ROM) 1*b*, a random access memory (hereinafter referred to as RAM) 1*c*, and a timer 1*d*, which compose a digital computer. The MIDI sequencer 1 further includes a floppy disk controller 1*e* for driving and controlling the floppy disk unit 3, an LCD controller 1*f* for driving and controlling the LCD 5, an interface 1*g* for inputting and outputting event data in sequence, an input interface 1*h* for the keys 7 and 9, and a bus line 1*i* for connecting them to one another to transmit various signals.

The keyboard 11 also has a CPU 11*a*, a ROM 11*b*, a RAM 11*c*, and a timer 11*d*, which compose a digital computer. The keyboard 11 further includes a sound source 11*e* for converting digital event data into an analog sound signal, an amplifier 11*f* for amplifying the analog sound signal, a speaker 11*g* for generating sound from the amplified sound signal, an interface 11*i* for keys 11*h*, an interface 11*j* for inputting and outputting event data in sequence, and a bus line 11*k* for connecting them to one another to transmit various signals.

Figure 4:
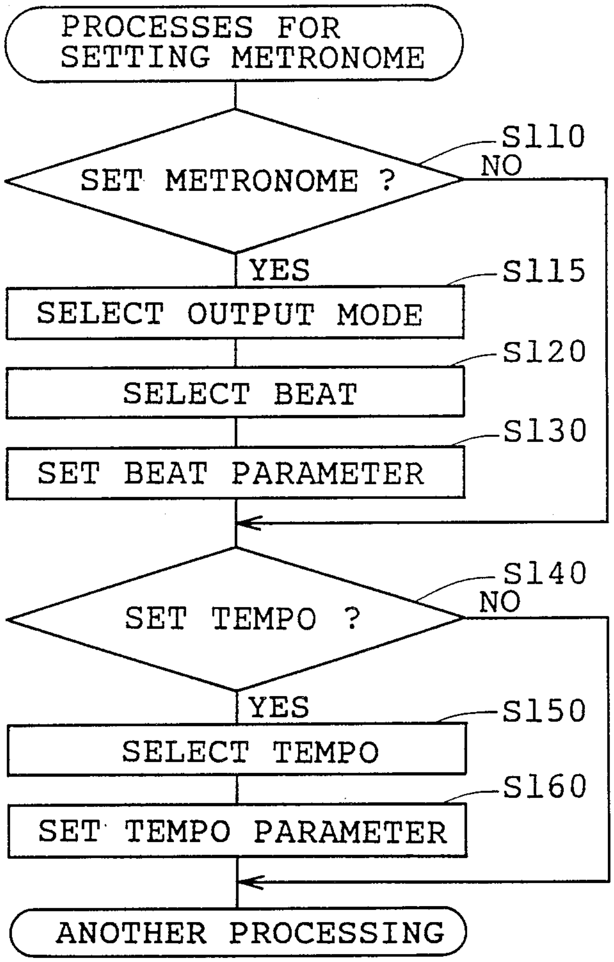
FIG. 4 is a flow chart showing steps for setting conditions for the metronome function of the MIDI sequencer of FIG. 2.
Figure 5:
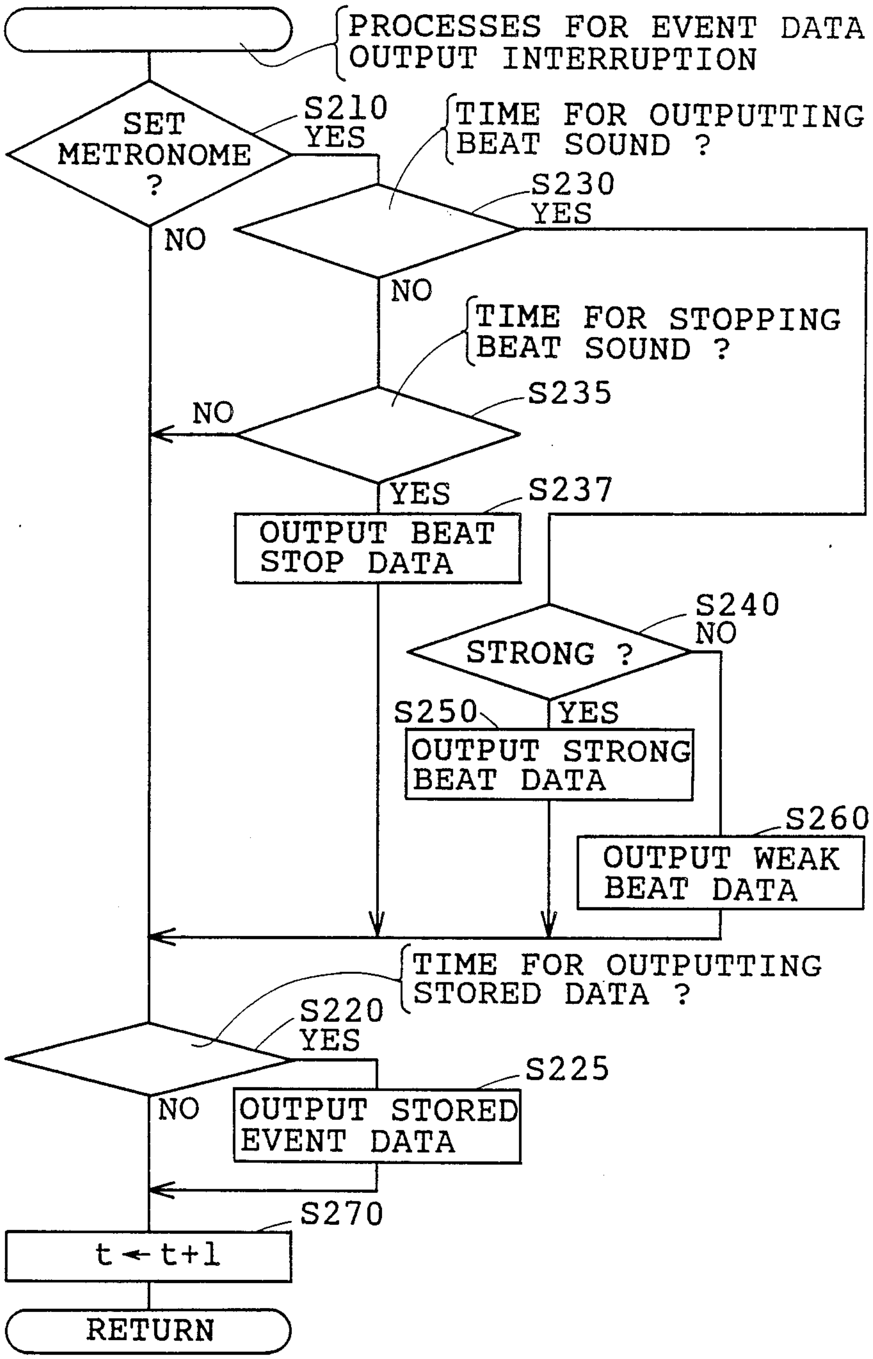
FIG. 5 is a flow chart showing steps for output interruption of event data.

The CPU 1*a* of the MIDI sequencer 1 executes various processes; steps for setting conditions for the metronome function are explained based on a flow chart of FIG. 4, and steps for output interruption of event data for generating both beat sound and a main tune are based on a flow chart of FIG. 5. Although the keyboard 11 also executes various processes including normal performance, automatic performance based on event data input and output of event data, they are all well known and thus the explanation is omitted here.

When the operation of the function keys 7 and the shift keys 9 of the MIDI sequencer 1 starts processing, at step S110 it is determined if the MIDI sequencer 1 is shifted into the mode for setting the metronome function. When the set mode is selected by the function keys 7 and the shift keys 9, the output mode for the metronome function is selected at step S115. First the metronome function of the MIDI sequencer 1 is determined to be activated, and a timing for activation is then selected; e.g., activated while performance of music is being recorded or reproduced. A channel is also selected; a channel is a code for discriminating event data for a target musical instrument from which a metronome sound is generated.

At step S120, beat is selected by the function keys 7 and the shift keys 9. For example, one of the values displayed on the LCD 5, '1' through '16', is selected. When the value '4' is selected, beat is in four-four time or 4/4; one-four time or $\frac{1}{4}$ for the value '1' and sixteen-four time or 16/4 time for the value '16' in the same manner. The value selected is written as a parameter for the beat of music in a certain address of the RAM 1*c* at step S130 and is used as beat data for further processes.

At step S140 it is determined if tempo for music is set. If the answer is YES, the program proceeds to step S150 where tempo for music is set between '10' and '90'. When the value set is '10', the length of a quarter note or a crochet corresponds to one thirtieth minute (1/30); in the value '90', the same corresponds to one two hundred and seventieth minute (1/270) and in the value '40', the same to 0.5 sec or one hundred and twentieth minute (1/120). The value selected is written as a parameter for the tempo of music in a certain address of the RAM 1*c* at step S160 and is used as tempo data for further processes, i.e., for setting intervals for interruption. Here the program exits from the processes for setting conditions for the metronome function and proceeds to another processes for setting other required parameters. In the initial setting, the metronome function is 'OFF', the channel selected is '1', the value selected for the beat is '1', and the value set for the tempo is '40'.

Steps for output interruption of event data based on the parameters set in the above processes are explained with the flow chart of FIG. 5. The operation of the function keys 7 and the shift keys 9 starts timer interruption processes. The interval for interruption of the timer 1*d* is determined based on the tempo data set in the above manner. For example, when the value for the tempo is '40', the interval for interruption is 0.5/96 sec (approximately 5.2 msec).

At step S210, it is determined if the metronome function is set while the MIDI sequencer 1 is in reproducing condition. When the metronome function is not set, the program proceeds to step S220 where the current time is compared with a time set for outputting stored data. If it is still not the time for output, at step S270 the value t on the timer counter of the RAM 1*c* is incremented by one and the program once exits from the process. After the time interval for interruption elapses, the steps above are again executed.

Figure 6:
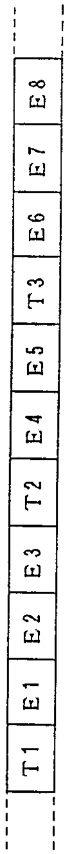
FIG. 6 is a diagram showing an arrangement of playing information stored in the RAM of the MIDI sequencer of FIG. 3.

When the value t on the timer counter becomes equivalent to an output time for the first event data stored in a certain track of the RAM 1*c*, the first event data is output . FIG. 6 shows an arrangement of playing information stored in the RAM 1*c*. Here T1 through T3 are time data and E1 through E8 are event data.

The event data is not output until the time T1 because of the negative judgment at step S220. At the time T1, the event data E1 through E3 are successively output through the MIDI signal cable 13 at step S225. Since a channel or a code data for discrimination is assigned to each of the event data E1 through E3, the keyboard 11 or another musical instrument receives the event data and compares the discrimination code for the event data with its own channel. When the channel for the output data is equal to that for the instrument, the musical instrument sounds and starts playing a tune or part of a tune corresponding to the event data. Before the next output time T2, the event data is not output even if the interruption processes are executed. At time T2, the event data E4 and E5 are output, and at time T3, the event data E6 through E8 are output. The program repeats the same routine until the end of playing information; that is, the process at S220 where the time data on the track is checked and the process at S225 where the event data is output is repeated.

When a large value is set for the tempo data, the interval for interruption is shortened and the time count is executed more frequently. The interval for outputting event data is also shortened and music is played at a fast tempo.

When the metronome function is set at step S210, the program proceeds to step S230 where the current time is compared with a time set for outputting beat sound. The output time for beat sound is calculated based on the beat data stored. For example, if beat is in four-four time, a beat sound is output every time when the value t on the counter becomes equal to a multiple of ninety six; once every four times event data for generating a strong beat sound is output. The value t shows the absolute time from the start of a performance. When the value t is equal to a multiple of 96, i.e., when t is divided by 96 without a remainder, it is the timing for outputting a beat sound. When the value t is equal to a multiple of 384 (=96×4), i.e., when t is divided by 384 without a remainder, it is determined to be the timing for outputting a strong beat sound at step S240. At steps S250 and S260, event data for generating a strong or weak beat sound is output. When beat is set in three-four time, a beat sound is generated every time when the value t becomes equal to a multiple of 96 and a strong beat sound is generated every multiple of 288 (=96×3).

When a predetermined time period has elapsed since the event data output for generating a beat sound at step S235, event data for stopping beat sound is output at step S237. For example, when the value t on the time counter becomes equal to a multiple of 96 plus 12, beat sound is stopped at step S237 after the positive judgment at step S235.

The value t on the counter is not cleared during a performance of a tune and shows the time elapsing since the start of the performance. Even when playing information is reproduced not from the beginning but from the middle, the timing for generating a strong or weak beat sound is not shifted. Every event data is stored with corresponding time data, i.e., the absolute time T1, T2 etc., as shown in FIG. 6. Thus when the absolute time for outputting event data from the middle is set on the timer counter, output timing for generating a beat sound is accurately calculated.

Although processes of the flow chart of FIG. 5 are executed while the MIDI sequencer 1 is in reproducing conditions, similar processing may be executed while the sequencer 1 records performance of the keyboard 11 or any other musical instruments. Event data input from the keyboard 11 and transmitted via the MIDI signal cable 15 is stored together with corresponding time data on a certain track in the RAM 1*c* as shown in FIG. 6. The interruption processes of FIG. 5, except steps S220 and S225, are executed.

Figure 7:
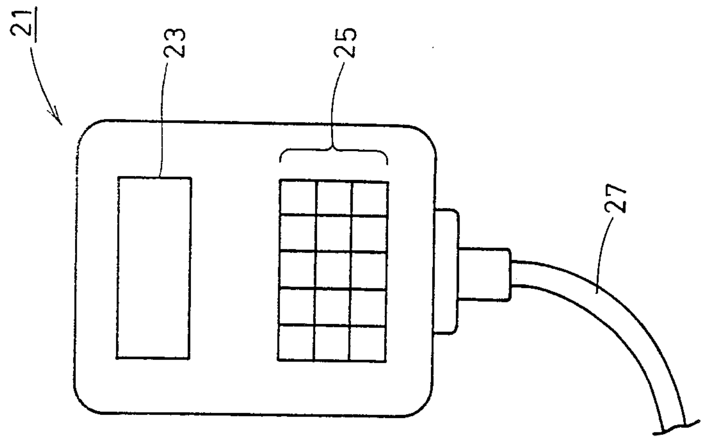
FIG. 7 is a schematic view of a metronome of a second embodiment according to the invention.

FIG. 7 shows a metronome 21 of a second embodiment according to the invention. The metronome 21 is a device for outputting event data to musical instruments based on tempo data and beat data previously set. Tempo data and beat data are set through the operation of keys 25 and are displayed on a liquid crystal display (LCD) 23. Plural channels may be set for plural musical instruments which receive event data. An MIDI signal cable 27 of the metronome 21 is attached to an input port of a musical instrument to be played and processes of steps S230 through S270 of FIG. 5 are executed. The musical instrument thereby generates metronome sound at a tempo and in beats previously set.

Both the apparatus of the first and second embodiments generate metronome sound without any specific metronome devices attached thereto when an electronic instrument has a communication function like an MIDI. Since metronome signals and signals for performing a tune are processed in the same manner, they are output together through the same speaker or headphones. While wearing headphones, a player can hear metronome sound and can thus play a tune accurately. Any sound including metronome sound is accordingly not generated to the surroundings, thus preventing noise pollution.

In the above embodiments, a strong beat and a weak beat may be discriminated by either a volume or pitch difference.

Figure 1:
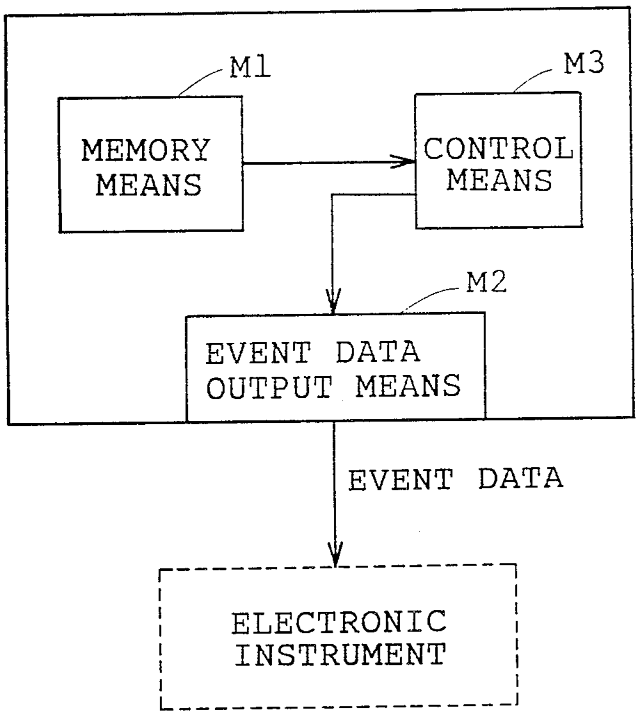
FIG. 1 is a block diagram showing features of the invention.

In the above embodiments, the RAM 1*c* corresponds to the memory means M1, the interface 1*g* to the event data output means M2 and the CPU 1*a* and the ROM 1*b* to the control means M3 in FIG. 1.

In the metronome for electronic instruments of the invention, code data for generating beat sound for a certain time period is output at pitches and volumes based on beat data and at time intervals according to tempo data. The metronome of the invention generates beat sound together with main sound for a tune without any specific devices attached to electronic instruments dedicated to producing beat sound. While wearing headphones, a player hears the metronome sound and plays music at a correct tempo and in suitable beats according to the metronome sound. Any specific device for generating metronome sound, e.g., a buzzer, is thus not required and metronome sound does not cause noise pollution since it is generated through the headphones.

What is claimed is:

1. A data output device for outputting code data to an electronic instrument that generates sound under control of code data, comprising:

memory means for storing at least tempo data representing a speed and beat data representing a beat of the piece of music;

event data output means; and control means for instructing the event data output means to output code data corresponding to the beat data at time intervals corresponding to the tempo data to the electronic instrument such that the electronic instrument generates at least a beat sound for a predetermined time period at pitches and volumes corresponding to the beat data and at time intervals corresponding to the tempo data.

2. The data output device according to claim 1 further comprising setting means for setting conditions of the beat sound, where the conditions of the beat sound are stored in the memory means as the tempo data and the beat data.

3. The data output device according to claim 2 further comprising:

data input means for receiving event data from an electronic instrument; wherein the event data received from the electronic instrument for the piece of music is code data that represents the tune of the piece of music and is stored in the memory means along with the tempo data and the beat data for the piece of music; and the control means instructs the event data output means to output code data comprising beat data and event data to the electronic instrument at time intervals corresponding to the tempo data.

4. The data output device according to claim 3, in which the control means further comprises output interruption means for directing the output means to interrupt the output of the event data based on the tempo data and to output the beat data while the event data is interrupted.

5. The data output device according to claim 1, in which the beat data further comprises strong/weak data for controlling the electronic instrument to generate a strong beat sound or a weak beat sound.

6. The data output device according to claim 3, in which the event data output means outputs code data comprising beat data and event data to a .plurality of electronic instruments at time intervals corresponding to the tempo data, and the event data and beat data further comprise channel data for determining which beat data and event data correspond to each of the plurality electronic instruments.

7. A data output device for outputting code data to an electronic instrument that generates sound under control of code data, comprising:

setting means for setting conditions of a beat sound as tempo data representing a speed and beat data representing a beat of the piece of music;

event data output means; and control means for instructing the event data output means to output code data corresponding to the beat data at time intervals corresponding to the tempo data to the electronic instrument such that the electronic instrument generates at least a beat sound for a predetermined time period at pitches and volumes corresponding to the beat data and at time intervals corresponding to the tempo data.

8. The data output device according to claim 7 further comprising storing means for storing at least conditions of the beat sound, where the conditions of the beat sound are stored in the memory means as the tempo data and the beat data.

9. The data output device according to claim 8, in which the beat data further comprises strong/weak data for controlling the electronic instrument to generate a strong beat sound or a weak beat sound.

10. The data output device according to claim 9, in which the event data output means outputs code data comprising beat data to a plurality of electronic instruments at time intervals corresponding to the tempo data, and the beat data furthers comprise channel data for determining which beat data correspond to each of the plurality electronic instruments.

11. A data output device for outputting code data to an electronic instrument that generates sound under control of code data, comprising:

setting means for setting conditions of the beat sound, where the conditions of the beat sound are stored in the memory means as tempo data representing a speed and beat data representing a beat of the piece of music.

memory means for storing at least the tempo data and beat data;

event data output means; and control means for instructing the event data output means to output code data corresponding to the beat data at time intervals corresponding to the tempo data to the electronic instrument such that the electronic instrument generates at least a beat sound for a predetermined time period at pitches and volumes corresponding to the beat data and at time intervals corresponding to the tempo data.

12. The data output device according to claim 11 further comprising:

data input means for receiving event data from an electronic instrument; wherein the event data received from the electronic instrument for the piece of music is code data that represents the tune of the piece of music and is stored in the memory means along with the tempo data and the beat data for the piece of music; and the control means instructs the event data output means to output code data comprising beat data and event data to the electronic instrument at time intervals corresponding to the tempo data.

13. The data output device according to claim 12, in which the control means further comprises output interruption means for directing the output means to interrupt the output of the event data based on the tempo data and to output the beat data while the event data is interrupted.

14. The data output device according to claim 15, in which the beat data further comprises strong/weak data for controlling the electronic instrument to generate a strong beat sound or a weak beat sound.

15. The data output device according to claim 14, in which the event data output means outputs code data comprising beat data and event data to a plurality of electronic instruments at time intervals corresponding to the tempo data, and the event data and beat data further comprise channel data for determining which beat data and event data correspond to each of the plurality electronic instruments.

16. The data output device according to claim 15, in which the electronic instruments process the event data and beat data in the same manner such that the sound generated by the musical instruments comprises beat sound and music and is output through an output device.

17. The data output device according to claim 16, in which the electronic instruments selectively outputs the sound through either a speaker or a headphone jack.

18. The data output device according to claim 5, in which the strong/weak data is determined by raising or lowering the volume and/or the pitch of the sound represented by the beat data.

19. The data output device according to claim 9, in which the strong/weak data is determined by raising or lowering the volume and/or the pitch of the sound represented by the beat data.

20. The data output device according to claim 14, in which the strong/weak data is determined by raising or lowering the volume and/or the pitch of the sound represented by the beat data.

* * * * *